US011680728B2

United States Patent
Narayanan et al.

(10) Patent No.: US 11,680,728 B2
(45) Date of Patent: Jun. 20, 2023

(54) ANIMAL HOUSE CEILING VENT BULB SEAL

(71) Applicant: The GSI Group, LLC, Assumption, IL (US)

(72) Inventors: Srinivasan Narayanan, Assumption, IL (US); Arron Justin Cochran, Pawnee, IL (US); Brian Lee Rieck, Taylorville, IL (US); Nathan Robert Eversole, Assumption, IL (US)

(73) Assignee: The GSI Group LLC, Assumption, IL (US)

( * ) Notice: Subject to any disclaimer, the term of this patent is extended or adjusted under 35 U.S.C. 154(b) by 0 days.

(21) Appl. No.: 17/450,484

(22) Filed: Oct. 11, 2021

(65) Prior Publication Data

US 2022/0128264 A1 Apr. 28, 2022

Related U.S. Application Data

(60) Provisional application No. 63/104,035, filed on Oct. 22, 2020.

(51) Int. Cl.
*F24F 13/14* (2006.01)
*A01K 1/00* (2006.01)
*F24F 13/15* (2006.01)

(52) U.S. Cl.
CPC ........ *F24F 13/1406* (2013.01); *A01K 1/0058* (2013.01); *F24F 13/15* (2013.01)

(58) Field of Classification Search
CPC ...... F24F 13/15; F24F 13/1406; A01K 1/0058
USPC ...... 454/5; 119/458, 416–537; 49/74.1, 91.1
See application file for complete search history.

(56) References Cited

U.S. PATENT DOCUMENTS 5,168,915 A * 12/1992 Lafleur ............... E06B 3/66361
160/236
8,827,781 B2 * 9/2014 Aderman ............. A01K 1/0058
454/348

* cited by examiner

*Primary Examiner* — Vivek K Shirsat

(57) ABSTRACT

A ceiling vent assembly has a frame and a pair of louvers pivotably mounted in the frame such that each of the louvers pivots between an open position and a closed position. Each of the louvers has a pivot end, wherein the pivot end of a first louver of the pair of louvers is located adjacent to but spaced apart from the pivot end of a second louver of the pair of louvers. The ceiling vent has a sealing mechanism positioned in the space between the first and second louvers so as to press on the pivot ends of the first and second louvers such that the sealing mechanism reduces the flow of air through the space. When the first and second louvers pivot between the open and closed positions, the pivot end of the first and second louvers slide relative the sealing mechanism.

3 Claims, 3 Drawing Sheets

ANIMAL HOUSE CEILING VENT BULB SEAL

CROSS REFERENCE TO RELATED APPLICATION

This application claims the benefit of U.S. Provisional Application No. 63/104,035, filed Oct. 22, 2020, which is hereby incorporated by reference in its entirety.

BACKGROUND

Field of Invention

This disclosure relates to ceiling vents, and, in particular, to a ceiling vent for use in animal houses.

Description of Related Art

Vents are often used as part of the ventilation system for an animal house (such as a poultry house). The vents are generally located in the roof, ceiling, or sidewalls of the animal house. Each vent contains louvers or blades which are moved from a closed position and an open position. In the open position, the vent will allow fresh air to enter the animal house to help ventilate the animal house.

The louvers of ceiling vents typically move to an open position by force of gravity and moved to a closed position by pulling a cable. When in the closed position, sometimes air still leaks past the louvers. This does not always provide for efficient flow and circulation of air within the animal house. It would be beneficial to provide a ceiling vent which is more efficient in how it makes a seal when in the closed position.

BRIEF SUMMARY

Briefly stated, in one aspect the invention is directed to a ceiling vent assembly for use in a ceiling of an animal house. The ceiling vent assembly has a frame and a pair of louvers pivotably mounted in the frame such that each of the louvers pivots between an open position and a closed position. Each of the louvers has a pivot end, wherein the pivot end of a first louver of the pair of louvers is located adjacent to but spaced apart from the pivot end of a second louver of the pair of louvers. The ceiling vent has a sealing mechanism positioned in the space between the first and second louvers so as to press on the pivot ends of the first and second louvers such that the sealing mechanism reduces the flow of air through the space. When the first and second louvers pivot between the open and closed positions, the pivot end of the first and second louvers slide relative the sealing mechanism.

This summary is provided to introduce concepts in simplified form that are further described below in the Description of Preferred Embodiments. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

Corresponding reference characters indicate corresponding parts throughout the several views of the drawings.

DESCRIPTION OF PREFERRED EMBODIMENTS

Figure 1:
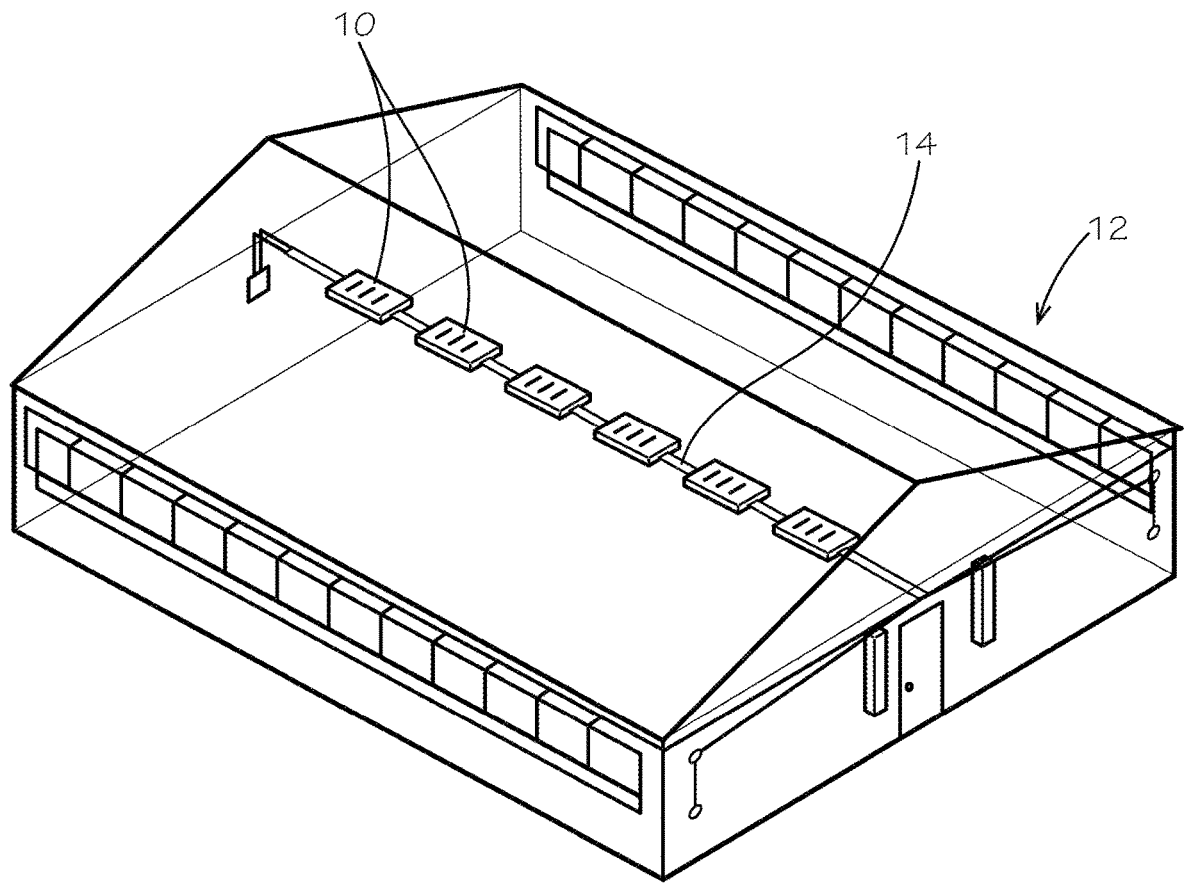
FIG. 1 is a schematic view of an animal house having a series of ceiling vents.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Turning now to the drawings, FIG. 1 schematically shows a series of ceiling vents 10 mounted in a ceiling (removed for clarity) of an animal house 12. At least one control rod 14 extends between the ceiling vents so that a plurality of the ceiling vents 10 can be opened or closed together. The control rods 14 are configured to selectively move a respective portion of louvers of the ceiling vents 10 between their open and closed positions as will be described in more detail below.

Figure 2:
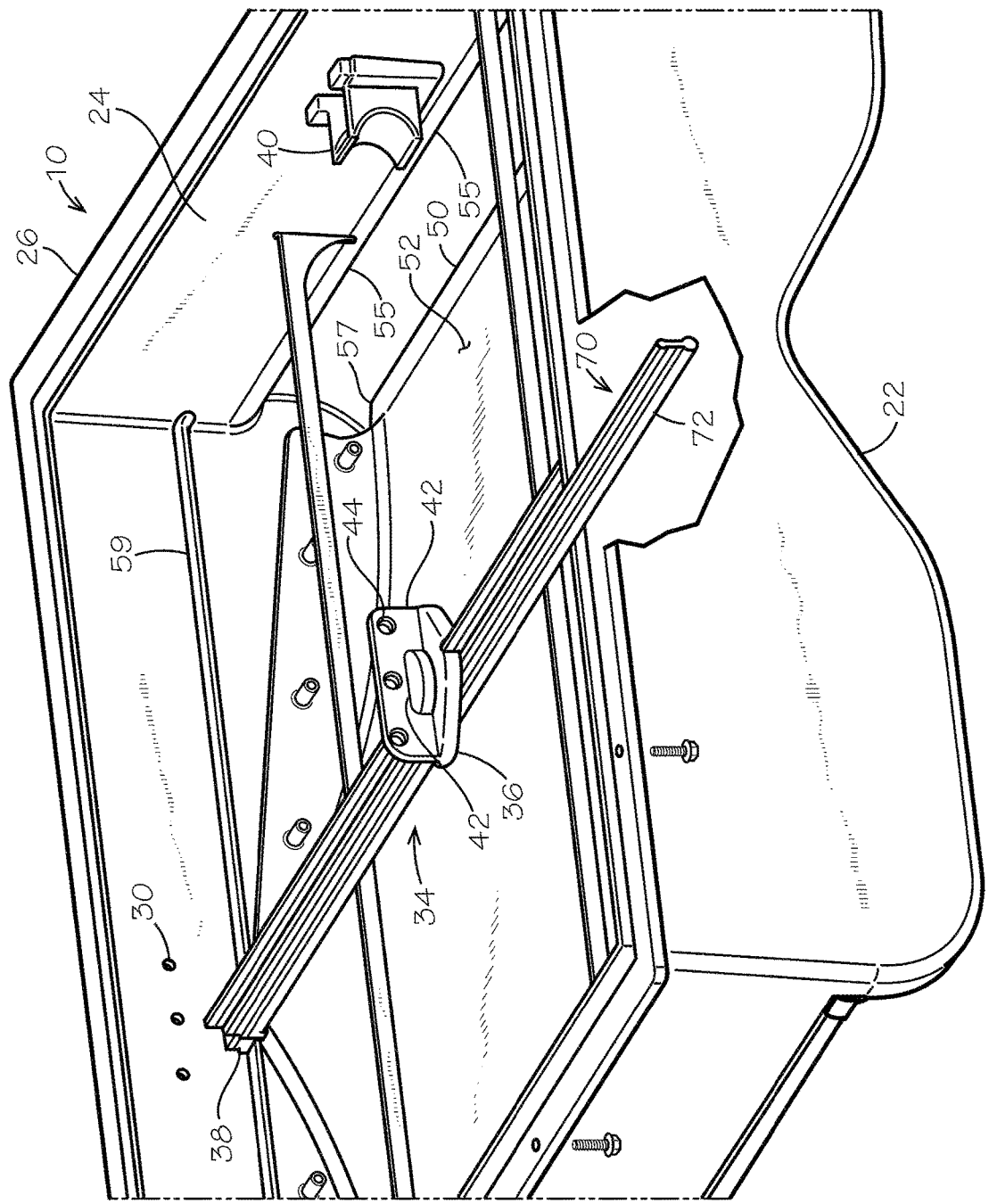
FIG. 2 is a perspective view of one of the ceiling vents of FIG. 1.

Turning now to FIG. 2, the ceiling vent 10 has a pair of opposed end panels 22 and a pair of opposed side panels 24, which, in combination, define a frame 26 that is open at its top and bottom. As seen, the frame 26 is generally quadrilateral in shape. The frame 26 may be made from a variety of materials, including metal and/or plastic. The end panels 22 and side panels 24 can be independent pieces which are assembled together to form the frame 26. Alternatively, the end panels 22 and side panels 24 of frame 26 can be a one-piece, unitary element of the ceiling vent 10. A flange 28 extends around the frame 26 near the top edges of the end and side panels 22 and 24. The flange 28 may function as a mounting flange which mates with a surface of a ceiling (not shown) in which the ceiling vent 10 is installed.

A plurality of rod openings 30 extends through each of the end panels 22. Each rod opening 30 in one end panel 22 has a corresponding rod opening 30 in the opposite end panel 22 such that the two rod openings 30 define a line which is generally parallel to the sidewalls 24. In the illustrated embodiment, there is a first pair of openings in a right portion of the end panels 22, a second pair of openings in a left portion of the end panels 22, and a third pair of rod openings 30 near a midpoint of the end panels 22. Although three pairs of rod openings 30 are shown in the illustrated embodiment, more or fewer openings could be used, if desired.

A pulley assembly 34 extends across the frame 26 between the side panels 24, generally at a mid-point along the length of the ceiling vent 10. The pulley assembly 34 includes a center pulley block 36 and a mounting bar 38 that is fixed to the frame 26 in any desired manner, such as by gluing, welding, bolting, riveting, etc. The center pulley block 36 may be attached to an upper or lower surface of the mounting bar 38. A vertically-oriented pulley 40 is mounted inwardly from each of the side panels 24. The pulley block 36 has at least one horizontally-oriented pulley 42. The pulley block 36 has a plurality of rod openings 44, with each rod opening 44 generally aligned with one of the pairs of rod openings 30 in the end panels 22, such that one of the at least one control rods 14 may pass through the aligned rod openings 30, 44 in the ceiling vent 10.

A pair of doors or louvers 50 is pivotally mounted in the frame 26. The louvers 50 are desirably identical and extend between the end panels 22. Each louver 50 has an upper surface 52 and a lower surface 54. The louver upper surface 52 defines a continuous curve from the inner edge to the outer edge of the louver 50. The curvature of the upper surface 52 conforms to the curvature of shoulder segments 55 on the inside surface of each side panel 24. The louver bottom surface 54 defines a curved portion 56 which extends most of the length of the louver 50, such that, for most of the length of the louver 50, the louver is of generally constant width. However, the outer end of the bottom surface 54 slopes upwardly so that the louver 50 tapers (i.e., reduces in width) toward its outer edge 57. Lastly, the louver 50 includes a hole 58 at the approximate center (length-wise) of the louver 50. The pulley assembly 34 is mounted to the frame 26 to be vertically above the louver hole 58. In the closed position, the end edges of the louver upper surface 52 are received by shoulder segments 59 in the end panel 22 and the upper surface 52 abuts the bottom of the side panels 24 along the outer edge of the louver 50. In this manner, each louver 50 seals against the frame 26 to substantially prevent air from passing between a surface of the louver and a surface of the frame 26 of the ceiling vent 10 when the louvers 50 are in their closed position. If desired, a sealing material, such as a deformable foam or felt could be positioned on the louver upper surface 52 to ensure a tighter seal between the louver 50 and the frame 26.

When the ceiling vent 10 is opened (i.e., when the louvers 50 are lowered), air will pass downwardly through the ceiling vent 10 into the animal house 12. Due to the shape of the louvers 50 and the radiused bottom edge 55 of the side panels 24, the air passing through the ceiling vent 10 will not simply drop down in to the animal house 12. Rather, the shape of the louvers 50 and the radiused edge 55 of the side panels 24 will tend to force the air outwardly and slightly upwardly so that the air moves across the ceiling of the animal house 12 and then down side walls of the animal house 12. Additionally, air moving along the louver 50 will be directed in an arc defined by the curvature of the louver upper surface 52 against which the airflow passes.

The louver 50 is pivotally mounted in the frame 26 to be movable between an open position and a closed position. In one embodiment, the louvers 50 are pivotable by means of pivot pins (not shown) that engage at opposite sides at inner pivot ends 60 of the louvers 50. Thus, each louver 50 pivots about its inner edge that is adjacent the other louver 50 in the ceiling vent 10. The pins extend through the openings (not shown) in the end panels 22 and can be integral with the louvers 50, or can comprise rods or screws which extend through the openings into the end edge of the louver 50. The pins could be integrally formed with the end panels, and be received in holes in the edges of the louvers 50. However, one skilled in the art will understand that the louvers 50 may be pivotably mountable in the frame 26 through any means using sound engineering judgment.

The ceiling vent 10, as noted above, is mounted in a ceiling of the animal house 12 with the louvers 50 at the bottom of the ceiling vent 10, as seen in FIG. 2. The louvers 50 are moved to the open position under gravity. The louvers 50 can be closed by means of a cable, cord, rope or the like (not shown). The cable will be connected to the louver 50 at one end, such as by extending through the louver hole 58 and being knotted on the bottom surface of the louver 50. The cable will extend up from the louver 50, pass over the vertical pulley 40, around the horizontal pulley 42 and to a position where it can connected to the control rod 14 with a cable clamp. The ceiling vent 10 desirably has two cables 62, one to operate each of the louvers 50.

The cable can be routed such that the louvers 50 on one side open and close together or that alternating louvers on either side open and close together. Desirably, there are two cables such that half of the louvers 50 may be opened and closed independently from the other half of the louvers 50. For example, the right side louvers 50 can be opened while the left side louvers 50 are closed, and vice versa.

Figure 3:
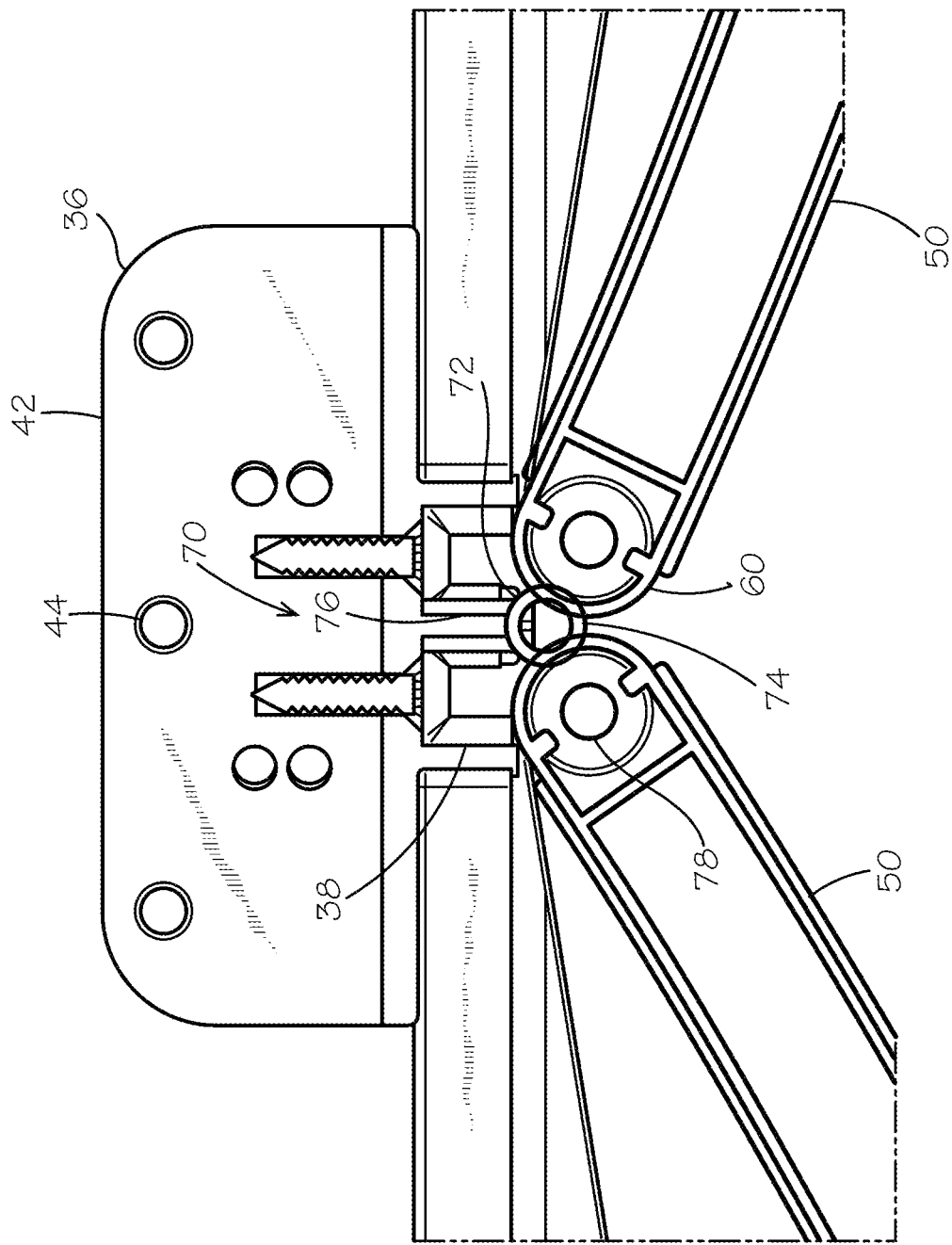
FIG. 3 is an enlarged side view of a portion of the ceiling vent of FIG. 2 showing a vent sealing mechanism.

According to the invention, a sealing mechanism 70 is located between the right and left louvers 50 of each ceiling vent 10. The sealing mechanism 70 allows the left and right louvers 50 to pivot between their open and closed positions while providing a substantially air-tight seal between the adjacent louvers 50 even when one or both of the louvers 50 are moving between their open and closed positions. Turning also now to FIG. 3, in one embodiment the sealing mechanism 70 is formed with a bulb seal 72 positioned between the pivot end 60 of each of the louvers 50. The bulb seal 72 is desirably constructed of a flexible material that compresses when pressed between the adjacent louvers 50.

In the illustrated embodiment, the bulb seal 72 has a generally tubular body 74 when the body 74 is in its normal or undeformed state having a length substantially equal with the length of the pivot end 60 of the louver 50. As shown the tubular body has a generally circular cross section when in its uncompressed state. However, one skilled in the art will understand that the bulb seal may have other tubular shapes or may even be of solid cross-section as long as the bulb seal compresses between the louvers 50 to form a seal. The bulb seal 72 desirably has at least one mounting flange 76 extending from the tubular body 74 used to interface with the mounting bar 38 and hold the bulb seal 72 in place. When the bulb seal 72 is brought into contact with the pivot ends 60 of the adjacent louvers 50, the tubular body 74 deforms or compresses to fill a space between the pivot ends 60 such that the tubular body 74 presses against the both louvers 50 to form an air-tight seal. As each louver 50 pivots about its pivot means 78, the pivot end 60 slides relative the tubular body 74, maintaining the air-tight seal.

The bulb seal 72 may be extruded with the positioning flanges 76 being part of the tubular body 74 as part of the forming process, or the positioning flanges 76 may be subsequently glued or otherwise attached to the tubular body 74 using sound engineering practice.

As various changes could be made in the above constructions without departing from the broad scope of the inven-

The invention claimed is:

1. A ceiling vent for an animal house having a frame formed with a pair of opposed end panels and a pair of opposed side panels such that the frame forms an opening between its top and bottom with a mounting bar extending between the end panels so as to traverse the opening, the ceiling vent having a pair of louvers pivotably mounted to the frame such that each louver of the pair of louvers pivots between an open position and a closed position relative the frame, each louver of the pair louvers having a pivot end, wherein the pivot end of a first louver of the pair of louvers is located adjacent to but spaced apart from the pivot end of a second louver of the pair of louvers, the ceiling vent comprising a sealing mechanism positioned in the space between the first and second louvers so as to press on the pivot ends of the first and second louvers, wherein the sealing mechanism has a tubular body with a length substantially equal to a length of the pivot ends of the pair of louvers with at least one mounting flange extending from the tubular body used to interface with the mounting bar to hold the sealing mechanism in place, wherein when the first and second louvers pivot between the open and closed positions the tubular body is deformed by the pivot ends of the first and second louvers to fill a space between the pivot ends and as the pivot ends of the first and second louvers slide relative the sealing mechanism such that the sealing mechanism reduces the flow of air through the space.

2. The ceiling vent of claim 1 wherein the sealing mechanism provides an air-tight seal between the pivot ends of the louvers.

3. The ceiling vent of claim 1 wherein the sealing mechanism comprises a bulb seal formed from a flexible material that compresses when pressed between the pair of louvers.

* * * * *